July 21, 1964  A. L. MICCIO  3,141,369
HAND SUPPORT FOR A HORN
Filed Nov. 23, 1962
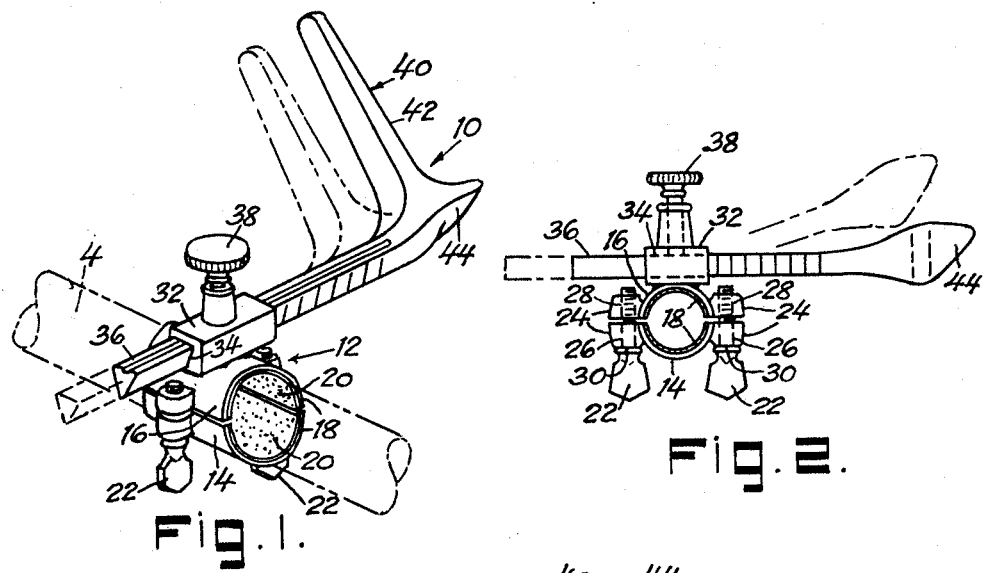
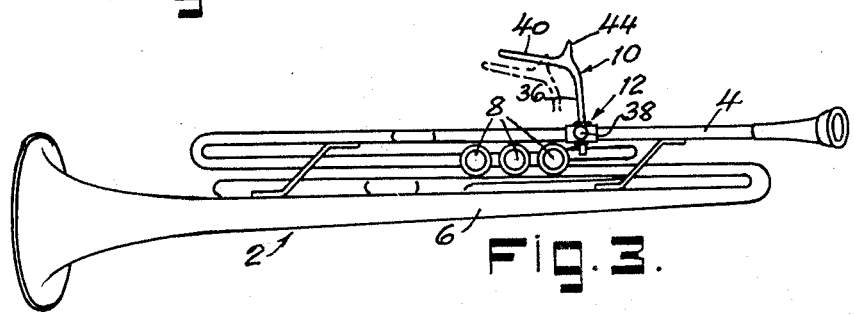
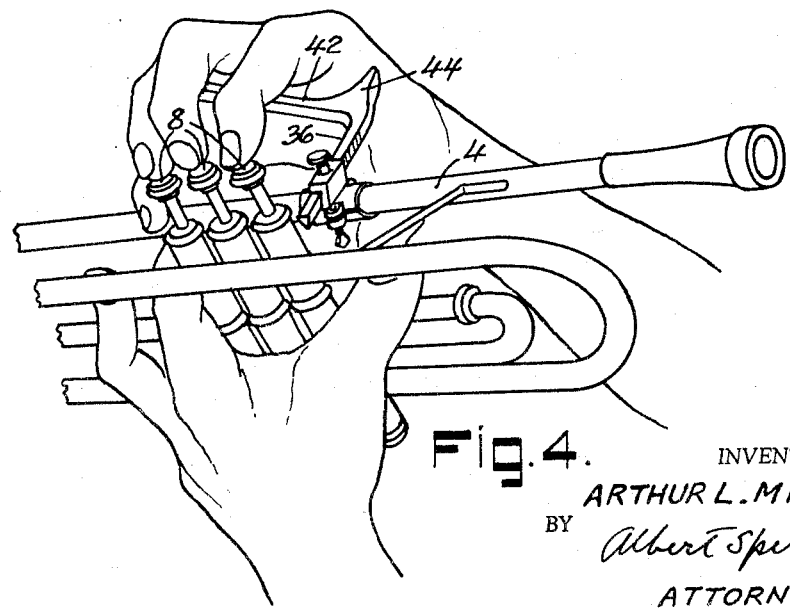
INVENTOR.
ARTHUR L. MICCIO
BY Albert Sperry
ATTORNEY

United States Patent Office 3,141,369
Patented July 21, 1964

3,141,369
HAND SUPPORT FOR A HORN
Arthur L. Miccio, 5 Guilford Lane, Trenton, N.J.
Filed Nov. 23, 1962, Ser. No. 239,737
1 Claim. (Cl. 84—387)

This invention relates to constructions adapted to be used with a trumpet or other type of horn to enable a musician to control the frequency and quality of the "hand vibrato" or the "arm vibrato." The invention further may be employed in the form of an attachment for application to a horn. It is also useful as an educational aid in positioning a student's hand so as to improve his performance of the key actuated slide valves on such instruments as the trumpet, cornet, French horn, or the like.

It has been very difficult heretofore for students of the trumpet or similar horns to learn and coordinate the movements of the fingers, the hand, the wrist, arm and horn necessary for proper execution of the vibrato. However, proper control of such movements is an essential element of the technique by which the warmth and beauty of tone is developed in the vibrato as performed by the artist as distinguished from the average player. In particular, the differences in the size and shape of every musician's hands, the length of the fingers and the manner in which the fingers, hand, and arm may be moved have rendered it necessary for each individual to develop his own vibrato technique by years of practice and experience. The teaching of the vibrato to students has, therefore, been difficult if not impossible heretofore.

In accordance with the present invention, these difficulties and limitations in the use and teaching of the trumpet and other horn techniques is overcome and control of the frequency and quality of the vibrato can be taught and achieved relatively easily.

In accordance with the present invention, these results can be attained by the use of a construction which may be applied to a horn or trumpet and secured thereto in such a position and manner as to afford a rest or positioning means for the musician's hand. In this way, the hand can be positioned and held in such a way that the keys of the horn may be actuated easily and quickly and the hand or arm vibrato may be performed in a manner to improve and control the frequency and quality of the tone.

Accordingly, the principal objects of the present invention are to facilitate the performance of vibrato effects on a horn, to improve the quality of the music rendered by those playing a trumpet, cornet, French horn, bugle or other type of horn, and to aid students in learning the proper positioning of the hand and movement of the fingers and arm in playing the trumpet and learning the vibrato.

These and other objects and features of the present invention will appear from the following description thereof wherein reference is made to the figures of the accompanying drawings.

In the drawings:

FIG. 1 is a perspective illustrating a typical form of hand supporting means embodying the present invention and adapted for use in playing the trumpet;

FIG. 2 is an end view of the construction shown in FIG. 1;

FIG. 3 is a top plan view of the construction illustrated in FIGS. 1 and 2 as seen when applied to a trumpet; and FIG. 4 is a perspective illustrating the relative positions of the musician's hands, the supporting means, and the trumpet during performance on the instrument.

In that form of the invention chosen for purposes of illustration in the drawings, the device is in the form of an attachment which is applied to a trumpet 2 having a mouth piece tube 4, a bell supporting tube 6, and a plurality of keys 8 by which slide valves or other means may be actuated in playing the trumpet.

The attachment of the present invention is indicated generally at 10 and embodies a hand supporting and positioning element 12. This element may be fixedly mounted on the trumpet in any selected or preferred manner to locate and position the musician's hand in the correct and most suitable location with reference to the keys 8 of the trumpet. Therefore, any musician can arrange the hand support so as to serve his particular needs whether his hand is large or small or his fingers long or short. For this purpose, the attachment preferably is provided with mounting means which include a lower clamping member 14 and an upper clamping member 16. These members present inwardly facing concave surfaces 18 adapted to engage the opposite sides of the mouth piece tube 4 of the trumpet. The inwardly facing surfaces 18 of both clamping members may be lined or provided with a yieldable frictional material 20 such as cork, rubber, plastic or the like, designed to engage the surface of the mouth piece tube 4 and prevent scratching, injury, or defacing of the tube upon application or removal of the attachment with respect to the trumpet.

The clamping members 14 and 16 are urged toward each other and into gripping engagement with the mouth piece tube 4 of the trumpet by means of thumb screws 22 or the like. For this purpose, both clamping members are provided with extensions 24 at the opposite ends thereof. The thumb screws 22 pass through openings 26 in the extensions 24 of the lower clamping member 14 and are threaded into engagement with tapped openings 28 in the extensions 24 at the opposite ends of the upper clamping member 16. Each thumb screw has a shoulder 30 thereon engageable with the upper surface of the extension 24 in the upper clamping member 16 through which it passes whereby the attachment may be securely mounted on the mouth piece 4 of the trumpet in any selected or preferred position.

The upper member 16 of the clamping means is further provided with a projection 32 having an opening 34 therein for receiving and holding the shank 36 of the hand supporting means 12. The opening 34 is preferably polygonal in cross section and, as shown in FIG. 1, is triangular in shape. The shank 36 of the hand supporting means is preferably similar in cross section but smaller in size than the opening 34 and thus also may be triangular in shape. The shank 36, therefore, may be moved readily within tubular opening 34 to any desired or adjusted position. A set screw 38 extends through the projection 32 of the upper clamping member 16 and into engagement with a flat side of the polygonal shank 36 of the hand supporting means 10. In this way, the opposite or remote sides of the shank 36 may be forced against the corresponding surfaces of the tubular opening 34 in the upper clamping member 16.

As a result, the shank 36 of the hand supporting means 12 may be fixedly and rigidly secured to the mouth piece tube 4 of the trumpet in any selected or preferred position. Thus, as shown in FIG. 3, the clamping means and hand support may be moved lengthwise of the trumpet along the mouth piece tube 4 from one position to another with reference to the keys 8, until the musician's hand and fingers are located in the correct and most effective position for manipulating the keys. In a similar way, the hand support 12 can be rotated about the mouth piece tube 4 to any required position as indicated in dotted lines in FIG. 2. Furthermore, as shown in FIG. 2, the hand support 12 can be adjusted toward or away from the mouth piece tube 4 and the keys 8 by loosening the thumb screw 38 and moving the shank 36 inward or outward within the opening 34 of the clamping means. In this way, the hand supporting means 12 can be located in the correct and most comfortable position to meet the needs of any musician, whether he be a student or an artist.

The hand supporting means 12 may be constructed in any of various forms or shapes. As shown, the hand supporting means is provided with a saddle or hand rest surface 40 which extends approximately at right angles to the shank 36 and in a direction generally parallel to the mouth piece tube 4 of the trumpet to which the attachment is applied. The surface 40 of the hand rest element 12 presents a relatively flat outer face 42 shaped to be engaged comfortably by the palm or portion of the musician's hand adjacent the base of the fingers, as shown most clearly in FIG. 4. One end 44 of the hand rest element 12 is preferably curved upward or in a direction outward from the trumpet to which the attachment is secured so as to provide a fixed shoulder against which the hand may bear when executing the vibrato. This positive positioning of the hand so that it will not slip or be displaced with respect to the trumpet when performing, the vibrato renders it possible to control the movements of the trumpet itself more effectively. As a result, the frequency of the tremolo or vibrato effect can be controlled entirely by the arm without shifting the hand with relation to the horn or keys.

The shoulder 44 of the hand support 13 also serves to assure the proper positioning of the musician's hand with respect to the trumpet so that the fingers will be located directly over the keys 8 and the proper fingering habits can be learned more easily and quickly. The practice of aligning the wrist with the forearm from the elbow to the valves will be readily acquired so that the elbow will automatically be located away from the chest and slightly below the shoulder. At the same time, the maximum flexibility of the fingers and skill in manipulating the keys with the tips of the fingers can be acquired by the student with less practice. Adjustments in the position of the hand rest element 40 of the hand support 12 are accordingly of advantage to all musicians, whether students, instructors, or professional musicians. At the same time, each musician can locate the elements in positions which are most suitable for his particular hand and the length of his fingers.

The firm but restful and accurate positioning of the musician's hand further renders it possible to perform the hand or arm vibrato more readily and with more effective control of the tone and frequency or tremolo effect. Furthermore, the performance of the vibrato can be taught and learned far more quickly and easily when the hand is in positive engagement with the trumpet through the hand rest and attachment of the present invention. It is, therefore, possible to teach the hand vibrato to students in the relatively early periods of their training and to enable them to progress more rapidly to the performance of intricate and difficult pieces of music.

The hand supporting attachment of the present invention is adapted for use on any of various types of horns, and while particularly useful on trumpets and other instruments provided with keys, it may be used on bugles or other types of horns when the execution of the hand vibrato is desired. Moreover, even when no such difficult performance is called for, the hand support may be used to aid in positioning and resting the hand during use of a horn.

The construction can, of course, be provided as a fixed and permanently positioned element of the horn. However, in order to attain the greatest advantages and flexibility of use, it is preferable to provide the invention as an attachment as herein shown and described. Further, although the hand supporting means is illustrated as having a radially extending shank 36 located adjacent one end of the hand supporting element 40, the hand support may be carried by a shank which is located centrally of the hand support so as to provide a generally T-shaped construction. It is also possible to vary the form and location of the hand positioning shoulder carried by the hand support and, in some instances, such a shoulder may be omitted altogether. It will also be apparent that the shank by which the hand support is carried may have one preferred polygonal or other form in cross section. Similarly, the shape, style, and construction of the clamp or mounting means for the shank and hand support may be varied considerably, particularly when the attachment is designed to be applied to other types of horns or musical instruments or is intended to be secured to some tube or portion of the instrument other than the mouth piece tube.

It will thus be apparent that the form, construction, and arrangement of the attachment and the combination of its elements and the use thereof are capable of many changes and modifications without departing from the spirit and scope of the invention. It should, therefore, be understood that the particular embodiment of the invention shown in the drawings and described above is intended to be illustrative only and is not intended to limit the invention.

I claim:

In combination with a trumpet having a mouth piece tube, a plurality of slide valves and keys arranged in a row generally parallel to said mouth piece tube for actuating said slide valves, an attachment for application to said trumpet, said attachment having a hand support carried thereby, clamping elements formed with complementary concave surfaces engageable with the mouth piece tube of the trumpet and movable longitudinally and circumferentially with respect to the mouth piece tube to a selected position, means for securing said clamping elements and attachment in said selected position on the mouth piece tube of the trumpet, the hand support carried by the attachment being provided with a surface extending generally parallel to the mouth piece tube and row of keys and presenting a shoulder at one end thereof projecting outward from said surface and engageable by the edge of a musician's hand resting on said surface of the hand support to prevent the hand from slipping longitudinally of the hand support when executing the hand or arm vibrato, said hand support having a shank extending therefrom substantially at right angles to the hand support and slidably engageable with one of the clamping elements secured to the mouth piece tube of the trumpet, and means for securing said shank and hand support in a selected position with respect to said clamping elements and the keys of the trumpet.

References Cited in the file of this patent

UNITED STATES PATENTS

| | | |
|---|---|---|
| 853,074 | Evans et al. | May 7, 1907 |
| 2,918,838 | Worrel | Dec. 29, 1959 |